April 17, 1962     B. F. PARR     3,030,487
COOKING VESSEL

Filed July 8, 1955     2 Sheets-Sheet 1

INVENTOR
BERNARD F. PARR
BY
ATTORNEY

April 17, 1962 B. F. PARR 3,030,487
COOKING VESSEL
Filed July 8, 1955 2 Sheets-Sheet 2

INVENTOR
BERNARD F. PARR
BY
ATTORNEY

United States Patent Office 3,030,487
Patented Apr. 17, 1962

3,030,487
COOKING VESSEL
Bernard F. Parr, Mansfield, Ohio, assignor to Westinghouse Electric Corporation, East Pittsburgh, Pa., a corporation of Pennsylvania
Filed July 8, 1955, Ser. No. 520,726
4 Claims. (Cl. 219—44)

This invention relates to a cooking vessel and particularly to an electrically heated thermostatically controlled skillet.

An object of this invention is to improve the construction of a cooking vessel of the type set forth so as to permit a substantial portion of it to be immersed in water while being cleaned.

Another object of this invention is to improve the construction of a vessel of the above mentioned type so that its handle, while easily gripped with two hands, is of such length that the vessel may be conveniently stored.

A further object of this invention is to improve the handle construction for a vessel of the above mentioned type to reduce the temperature of that portion of the handle most frequently grasped by the user and to provide a handle in which a mechanism for thermostatic control may be located.

A still further object of this invention is to improve temperature regulation and distribution of heat in a cooking vessel of the above mentioned type.

Another object of this invention is to improve the servicing of the above mentioned type of cooking vessel and reduce replacement costs when various parts of the vessel are damaged or malfunctioning.

In accordance with this invention, a vessel, having a sheathed heater attached in good heat transfer relationship to its bottom wall, is constructed with a separable handle including two vertically spaced horizontal gripping portions extending from one side of the vessel. Located within the handle is a manually adjustable temperature control that is actuated by a thermally responsive device such as a liquid filled temperature sensing bulb located in a heat conducting sleeve structure forming part of the bottom wall of the vessel. A capillary tube, connected to the bulb, and electrical leads connected to the terminals of the heater, extend through a passage in the handle to the control and to terminals to be connected to a plug on an appliance cord that extends to a power source. The handle is sealed to the vessel at one end of the passage to keep moisture from the control and the heater when the vessel is immersed for cleaning.

These and other objects are effected by the invention as will be apparent from the following description taken in connection with the accompanying drawings, forming a part of this application, in which.

Figure 1:
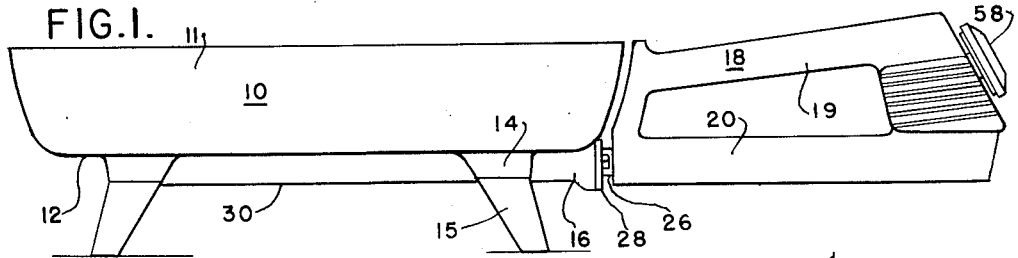
FIG. 1 is a side elevation of a cooking vessel.

The cooking vessel 10 shown in the form of a frying pan in FIG. 1 has a main food receiving portion having an upstanding side wall 11 completely surrounding a flat rectangular bottom wall 12. The vessel is made of cast aluminum and has formed integrally therewith four downwardly projecting embossed portions 14 to which are anchored the legs 15. Projecting downwardly from the bottom wall at the side of the vessel is a boss 16 to which is secured a handle 18.

The handle 18 is molded of a phenolic plastic material of poor heat conductivity and has a pair of separate grips shown as upper and lower horizontal gripping portions 19 and 20 joined at their opposite ends. The lower handle portion 20, lying approximately in the plane of the bottom wall 12, has one end fastened to the boss 16 and a passage 21 extends through the entire length of this portion. The upper handle portion 19 extends outwardly near the top of the vessel, but is supported entirely by the lower handle portion 20 directly above the latter and is spaced from the side wall 11. The outer end of the handle has a recess 24 communicating with the passage 21 for receiving a thermostatic control 25 for regulating the temperature of the bottom wall 12.

Figure 3:
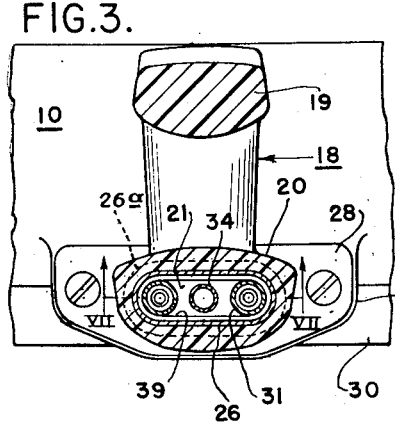
FIG. 3 is a vertical section taken along line III—III of FIG. 2.

Molded in one end of the handle 18 and extending into the passage 21 is a metal ferrule 26 having an outwardly extending flange at one end spaced from the handle. Encircling the ferrule between the handle and the flange is a flat clamping plate 28 for securing the handle to the boss 16 by means of screws as shown in FIGS. 3 and 6.

Figure 6:
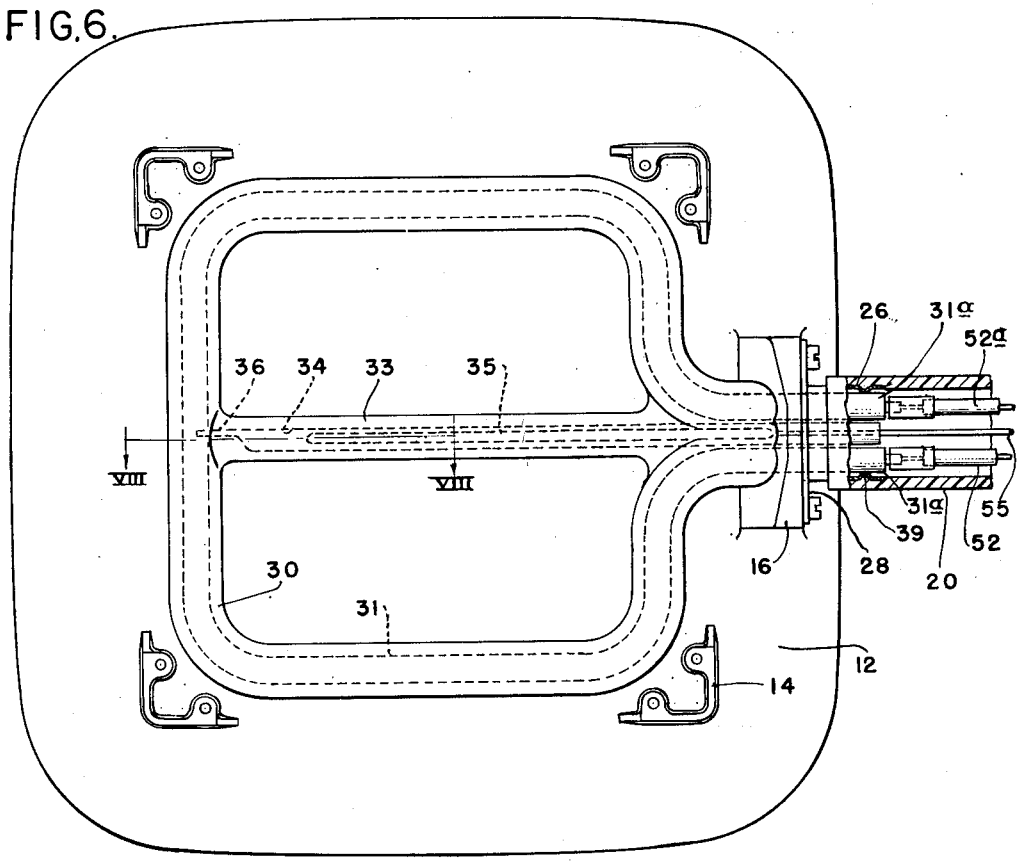
FIG. 6 is a bottom view of the vessel, shown in FIG. 1, with its legs removed and the handle partially cut away.

Referring to FIGS. 1 and 6, a raised rib 30 is cast integrally with the bottom wall of the vessel in a rectangular or loop pattern on the underside thereof about a sheathed electrical heater 31. Heater terminal portions 31a, including the ends of the heater sheath, project horizontally from the boss 16. Extending from the boss 16 across the center of the area enclosed by the heater is another raised rib 33 defining a sleeve structure having an elongated opening or passage for the reception of a liquid filled bulb 35, the latter forming a part of the control 25. The opening in the sleeve structure is defined by a tube 34 preferably cast within the rib 33.

Figure 8:
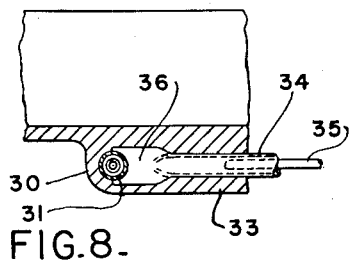
FIG. 8 is a section taken along the line VIII—VIII of FIG. 6.

Before being case in the vessel 10, the sheathed heater 31 and the heat conducting metal tube 34 are formed as a unit. One end of the tube 34 is sealed by flattening it and the flattened portion 36 is notched to straddle the heater as shown in FIG. 8. The open end of the tube 34 and the terminal portions 31a of the heater extend through holes in a metal plate 38 and are secured thereto by brazing or swaging. This construction prevents the tube from being displaced from the plane of the heater and facilitates handling during the casting operation.

Figure 2:
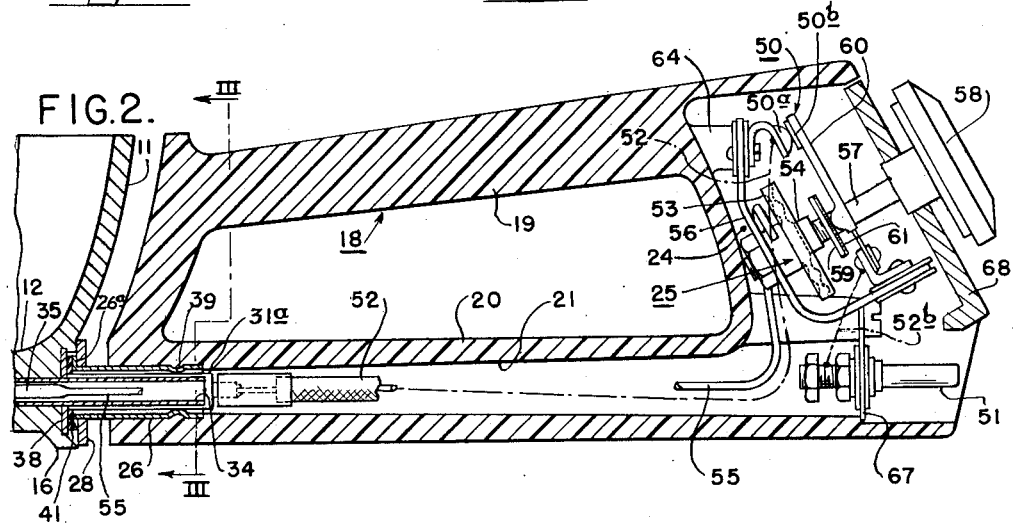
FIG. 2 is a vertical section taken on the vertical longitudinal center plane of the handle of the vessel shown in FIG. 1.
Figure 7:
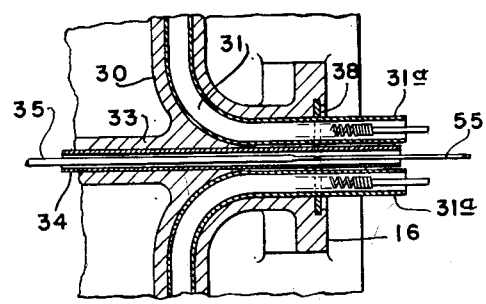
FIG. 7 is a horizontal section taken along the line VII—VII of FIG. 3 with the handle omitted.

The plate 38 is cast in the vessel along with the heater 31 and the tube 34 as shown in FIGS. 2 and 7. The terminal portions 31a of the heater 31 and the open end of the tube 34 project beyond the boss 16 and into the ferrule 26 when the handle is fastened to the boss. The portion of the ferrule 26 within the handle has an inwardly extending rib 39 that fits closely around the heater terminal portions 31a, as seen in FIGS. 2 and 3. The leverage of the heater portions 31a within the ferrule helps to support the vessel relative the handle and reduces the stresses on the fastening screws that secure the clamping plate 28. The face of the boss 16 adjacent the handle is recessed to receive a heat resisting silicone rubber gasket 41. The gasket, encircling the heater portions 31a and the tube 34, is compressed between the flange on the ferrule 26 and the plate 38 at the inner end of the recess to form a fluid tight seal therebetween when the clamping plate 28 is held tightly against the boss 16.

Figure 4:
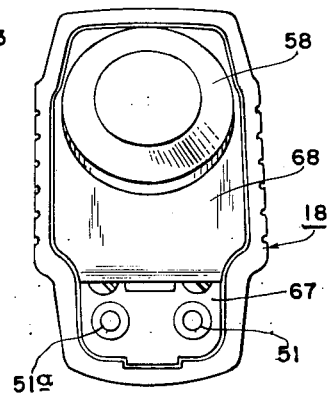
FIG. 4 is an end elevation of the handle shown in FIG. 2.

The thermostatic control 25 includes a switch 50 that is connected in series with the heater between two male terminals 51 and 51a, shown in FIGS. 2 and 4. Insulated electrical wires 52 and 52a extend through the passage 21 in the lower handle portion from the heater terminals 31a to a stationary contact 50a of the switch 50 and to the terminal 51a, respectively. Another wire 52b connects a movable contact 50b of the switch 50 with the terminal 51. Some of these connecting means are shown in phantom in FIG. 2. The wires 52 and 52a, connected to the heater terminsl 31a, are threaded through the passage 21 when the handle is attached to the vessel. The wires 52, 52a and 52b have sufficient slack, taken up within the handle, to permit them to be connected to the terminals 51 and 51a and to the control 25 before the latter are attached to the handle in the recess 24.

The switch 50 is actuated by a diaphragm element 53 having an abutment 54 that moves in response to expansion and contraction of fluid in the temperature sensing bulb 35. The bulb 35, located within the sleeve adjacent the bottom wall of the vessel, is connected to the diaphragm element 53 by means of a capillary tube 55 extending through the passage 21 in the handle. One side of the diaphragm element 53 is connected to a stationary frame 56 secured within the handle. The abutment 54 is threaded to receive the end of an adjusting screw 57 on which a manual control knob 58 is supported. The adjusting screw has a shoulder 59 for engaging and moving a resilient bifurcated member 60 that carries the movable contact 50b and is pivotally attached to the frame 56 but electrically insulated therefrom. The stationary contact 50a is mounted on the upper end of the frame 56 and is electrically insulated therefrom. An insulating washer 61 covers the face of the shoulder 59 to prevent the bifurcated member 60 from making direct electrical contact with the adjusting screw 57. The bifurcated member 60 is inherently biased in a direction to close the switch 50. As the fluid in the hydraulic system of the control is heated and expands, the abutment 54 moves the adjusting screw and its shoulder to the right as seen in FIG. 2. After the should 59 engages the bifurcated member 60, further expansion of the fluid will cause the bifurcated member 60 to open the switch 50. The temperature of the fluid in the bulb 35 at which the switch 50 opens to deenergize the heater 31 is determined by adjusting the screw 57 relative the abutment 54.

Figure 5:
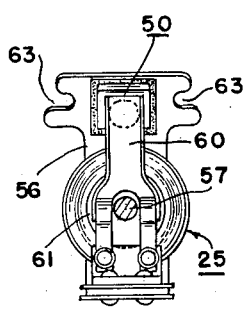
FIG. 5 is a view of the thermostatic switch, shown in FIG. 2, but removed from the handle, looking along the axis of its adjusting screw.

The upper end of the frame 56 has laterally extended slotted portions 63 as seen in FIG. 5 that are adapted to be secured in any convenient manner to projecting molded lugs 64 on the opposite sides in the recess in the outer end of the handle.

Supported beneath the control 25 in the recessed outer end of the handle 18 is a plate 67 to which are secured in insulated relationship the two male terminal members 51 and 51a for making electrical connections between the heater 31 and a power source. A plate 68 is attached in any convenient manner to the outer end of the handle to cover the recess 24 therein except for that portion around the terminals 51 and 51a. The cover plate 68 has a central opening therein through which a portion of the control knob 58 extends to connect with the adjusting screw 57. The knob and the cover plate may be provided with suitable indicia to indicate temperature adjustment of the control.

The bulb 35 fits closely within the opening in the vessel but may be slid therefrom through the handle passage 21 to allow the control to be detached from the handle structure 18 which encloses it without separating the latter from the vessel 10. Since the control 25, the handle 18 and the vessel 10 are all separable, any one of these components may be replaced if damaged without sacrificing the other parts.

The terminal portions 31a of the heater are separated only enough to permit the tube 34 to extend therebetween and the area of the bottom wall of the vessel adjacent the handle attaching bracket 16 will be heated as uniformly as the corresponding areas along the other three sides of the vessel. The hydraulic bulb 35 extends more than half way across the loop formed by the heater 31 and it responds directly to the average temperature of spaced points over a large area of the bottom wall 12 to improve the temperature regulation of this wall. The sleeve structure 33 being formed integrally with the vessel and being of good heat conducting material completely surrounds the hydraulic bulb 35 and causes the latter to closely follow the temperature of the bottom wall without being affected by ambient temperatures about the vessel except as such ambient temperatures affect the temperature of the vessel itself.

The sleeve not only improves the heat transfer between the bulb 35 and the bottom wall 12, but it also protects the bulb during normal use of the vessel. No part of the control 25 or its hydraulic system and no part of the heater 31 is exposed except through the recess 24 in the outer end of the handle. Thus the vessel may be completely submerged in water up to the recess 24 in the outer end of the handle to facilitate cleaning it without harming any of its parts.

The handle 18 is in heat conducting relationship with the vessel only adjacent the attached end of the lower gripping portion. Due to the longer heat flow path from the vessel through the poor heat conducting material of the handle to the upper handle portion 19, this portion of the handle, which is more frequently touched by the user, remains cooler than the lower handle portion 20. The handle is so shaped that the user is not likely to touch the vessel wall if he slides his hand forward along the upper gripping portion. The user's hand will be stopped by the vertically extending portion of the handle between the upper and lower gripping portions adjacent the vessel and also by the projection at the top of the handle near the vessel wall.

By having the gripping portions of the handle one above the other, the overall length of the handle may be reduced without sacrificing the convenience of being able to easily grasp the handle with two hands. In the illustrated embodiment of this invention, the use of the parallel handle gripping portions 19 and 20 enables the outer end of the handle to be enlarged to accommodate the control 25 without increasing the length of the handle as compared to the conventional type of skillet having a handle with a single outwardly extending gripping portion.

While the invention has been shown in but one form, it will be obvious to those skilled in the art that it is not so limited, but is susceptible of various changes and modifications without departing from the spirit thereof.

What is claimed is:

1. A cooking vessel having a bottom wall and an upwardly extending side wall surrounding said bottom wall, a handle attached to said vessel and extending horizontally therefrom, said handle having upper and lower horizontally extending gripping portions for enabling the user to hold said vessel by positioning his hands one above the other with each hand gripping one of said gripping portions, the lower gripping portion being attached directly to said vessel, the upper gripping portion being spaced from said vessel and supported by the lower gripping portion to lengthen the heat conducting path from said vessel to said upper gripping portion, said handle having a portion at the end thereof remote from the vessel for connecting said gripping portions, a thermostatic device for controlling heating of said vessel and having at least a portion thereof supported in said connecting portion of the handle.

2. A cooking vessel having a bottom wall and an upwardly extending side wall surrounding said bottom wall, a handle attached to said vessel and extending horizontally therefrom, said handle having separate upper and lower horizontally extending gripping portions, the upper gripping portion being disposed directly above said lower portion and the latter being attached directly to said vessel, said lower gripping portion having a passage extending therethrough, a sheathed heater attached to said bottom wall, said heater having terminal portions projecting horizontally at one side of said vessel and extending into said passage, electrical connecting means extending from said heater terminal portions through said passage for connecting said heater to a power source, and separable fastening and sealing means between said handle and said vessel preventing access of fluid to said heater terminals through one end of said passage.

3. A cooking vessel having a flat bottom wall and an upwardly extending side wall, a handle of poor heat conducting material attached to said vessel, said handle having a pair of grips vertically spaced one above the other and extending generally horizontally when the vessel is in cooking position, the upper grip being spaced from said vessel, a vertically extending handle portion at the end of the handle remote from the vessel supporting the upper grip from the lower grip, said grips enabling the user to hold said vessel by positioning his hands one above the other grasping the two grips, respectively, a device for controlling heating of the vessel, said control device being disposed at least in part in said vertically extending handle portion, and a manually adjustable member projecting from said vertically extending handle portion for adjusting said control device.

4. A cooking appliance comprising a metal pan having a flat bottom wall and side walls, an electrical sheathed heater integrally attached to said bottom wall, a sealed structure attached to said bottom wall and having an opening therein, a handle for said appliance, said handle having a pair of separate grips, one of said grips being attached to said pan adjacent said sealed structure and extending to the side of the pan near the plane of its flat bottom wall, said one grip having a passage therein communicating with the opening in said structure, electrical connections for said heater extending through said passage, the other grip extending outwardly from the pan above said one grip and the plane of said bottom wall, the latter grip being supported on the first mentioned grip at least in part by an end portion of the handle, an adjustable thermostatic control including a switch connected in series with said heater, said control including a temperature responsive element disposed in said sealed structure for sensing the temperature of the pan and connected to actuate said switch, manually adjustable means on said handle for selecting the temperature of said element at which said switch is opened to deenergize the heater and means in said passage connecting said manually adjustable means and said temperature responsive element for operating the control, and sealing means between said handle and said structure to prevent entry of moisture into said structure or said passage when said pan is immersed in water.

References Cited in the file of this patent

UNITED STATES PATENTS

| | | |
|---|---|---|
| 585,284 | Paden | June 29, 1897 |
| 1,089,667 | Poalk | Mar. 10, 1914 |
| 1,142,304 | Champ | June 8, 1915 |
| 2,232,998 | Cernohouz | Feb. 25, 1941 |
| 2,524,954 | Best | Oct. 10, 1950 |
| 2,571,782 | Swenson | Oct. 16, 1951 |
| 2,744,995 | Jepson | May 8, 1956 |

FOREIGN PATENTS

| | | |
|---|---|---|
| 253,236 | Switzerland | Nov. 1, 1948 |
| 664,113 | Great Britain | Jan. 2, 1952 |